(12) United States Patent
Berne et al.

(10) Patent No.: US 11,242,036 B2
(45) Date of Patent: Feb. 8, 2022

(54) WINDSHIELD WIPER, MOTOR VEHICLE COMPRISING SUCH A WIPER, AND METHOD FOR OPERATING SUCH A WIPER

(71) Applicant: Volvo Truck Corporation, Gothenburg (SE)

(72) Inventors: Nicolas Berne, Heyrieux (FR); Damien Chacaton, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 68 days.

(21) Appl. No.: 16/647,086

(22) PCT Filed: Sep. 14, 2017

(86) PCT No.: PCT/IB2017/001266
§ 371 (c)(1),
(2) Date: Mar. 13, 2020

(87) PCT Pub. No.: WO2019/053481
PCT Pub. Date: Mar. 21, 2019

(65) Prior Publication Data
US 2020/0216036 A1    Jul. 9, 2020

(51) Int. Cl.
*B60S 1/38* (2006.01)
*B60S 1/52* (2006.01)
*B60S 1/54* (2006.01)

(52) U.S. Cl.
CPC .............. *B60S 1/38* (2013.01); *B60S 1/524* (2013.01); *B60S 1/546* (2013.01); *B60S 2001/3812* (2013.01)

(58) Field of Classification Search
CPC .. B60S 1/38; B60S 1/524; B60S 1/546; B60S 2001/3812
See application file for complete search history.

(56) References Cited

U.S. PATENT DOCUMENTS

| | | | |
|---|---|---|---|
| 4,592,110 A | 6/1986 | Verton | |
| 5,172,449 A * | 12/1992 | Baumgarten | B60S 1/32 15/250.351 |
| 2005/0229351 A1 | 10/2005 | McMullen | |

FOREIGN PATENT DOCUMENTS

| | | |
|---|---|---|
| DE | 4243133 C1 | 11/1993 |
| DE | 29813251 U1 | 11/1998 |
| DE | 19754449 A1 | 5/1999 |
| DE | 10304045 A1 | 8/2004 |
| EP | 0280149 A2 | 8/1988 |
| EP | 0825077 A1 | 2/1998 |

(Continued)

OTHER PUBLICATIONS

DE19754449A1 (machine translation) (Year: 1999).*

(Continued)

*Primary Examiner* — Andrew A Horton
(74) *Attorney, Agent, or Firm* — Withrow & Terranova, PLLC

(57) ABSTRACT

The invention concerns a windshield wiper (10), comprising: a blade (20) for wiping a windshield (2), and a body (30) supporting the blade (20); wherein the windshield wiper (10) comprises a plurality of pistons (40) distributed all along the blade (20) for pressing the blade (20) against the windshield (2). The invention further concerns a motor vehicle comprising at least one such windshield wiper (10), and a method for operating such a windshield wiper (10).

14 Claims, 3 Drawing Sheets

(56) References Cited

FOREIGN PATENT DOCUMENTS

FR    1298483 A    7/1962
GB    1425568 A    2/1976

OTHER PUBLICATIONS

International Search Report and Written Opinion for International Patent Application No. PCT/IB2017/001266, dated Jun. 21, 2018, 9 pages.

* cited by examiner

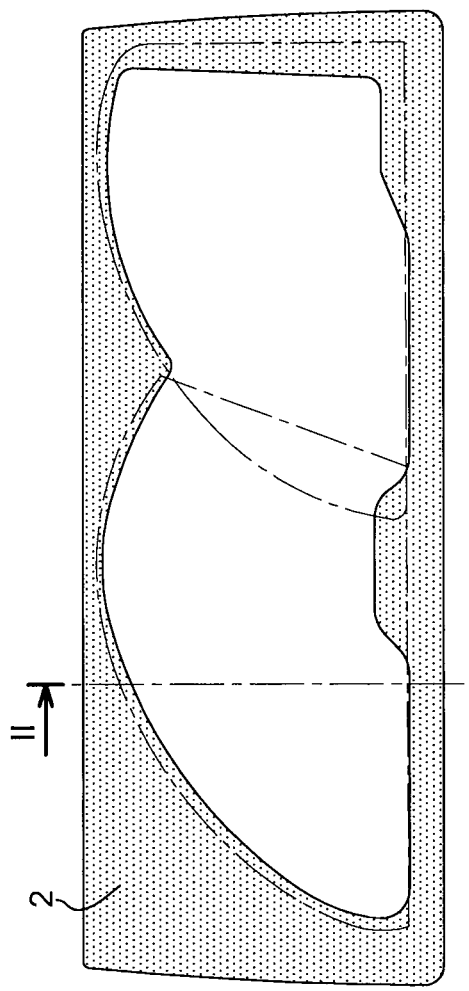
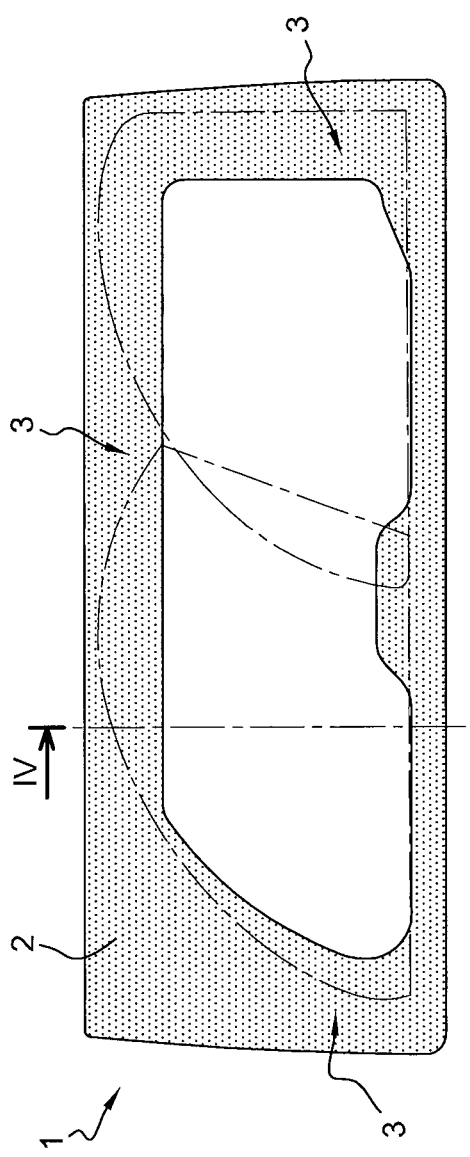

WINDSHIELD WIPER, MOTOR VEHICLE COMPRISING SUCH A WIPER, AND METHOD FOR OPERATING SUCH A WIPER

This application is a 35 USC 371 national phase filing of International Application No. PCT/IB2017/001266, filed Sep. 14, 2017, the disclosure of which is incorporated herein by reference in its entirety.

TECHNICAL FIELD OF THE INVENTION

The invention concerns a windshield wiper, in particular for a motor vehicle. The invention further concerns a motor vehicle comprising at least one such windshield wiper, and a method for operating such a windshield wiper.

BACKGROUND OF THE INVENTION

Classically, a windshield wiper comprises a blade for wiping a windshield, a body supporting the blade, and an articulated arm connecting the body to the vehicle frame.

In the technical field of windshield wipers, some developments seek to improve pressure distribution of the blade on the windshield. Indeed, an uneven pressure can lead certain areas of the windshield to be poorly cleaned in comparison with others.

EP0825077, DE4243133, GB1425568 U.S. Pat. Nos. 4,592,110, 5,172,449 and EP0280149 disclose various examples of windshield wipers, comprising elastic means for pressing the blade against the windshield. Such elastic means are subjected to fatigue wear in operation. Furthermore, as the pressure on the blade is higher where the elastic means are located, they do not provide a uniform pressure distribution.

FR1298483 discloses another example of windshield wiper, comprising magnetic means mounted inside the body and on the blade. However, such magnetic means are more expensive and more complex than elastic means.

Commonly, most windshields are slightly curved. Nowadays, windshields with more pronounced curvature are developed to improve aerodynamics of vehicles, in particular trucks, and to propose new designs of vehicles.

However, common wipers are not designed for cleaning windshields with important curvatures. That can lead to unwiped areas, in particular close to the periphery of the windshields.

SUMMARY OF THE INVENTION

The aim of the invention is to provide an improved windshield wiper.

To this end, the invention concerns a windshield wiper, comprising: a blade for wiping a windshield, and a body supporting the blade; wherein the windshield wiper comprises a plurality of pistons distributed all along the blade for pressing the blade against the windshield.

Thanks to the pistons, the pressure applied all along the blade can be discretized, so that a more uniform pressure distribution can be applied by the blade on the windshield. The invention avoids unwiped areas, in particular in curved areas of the windshield, or in areas having surface defects. In addition, by applying a more homogeneous and constant pressure, annoying wiping noise can be reduced. Furthermore, the pistons are less subjected to fatigue wear in operation than elastic means.

According to further aspects of the invention which are advantageous but not compulsory, such a windshield wiper may incorporate one or several of the following features:

- The plurality of pistons comprises at least ten pistons distributed along the blade.
- Adjacent pistons are separated by at most ten centimeters along the blade.
- The pistons are regularly distributed along the blade.
- The pistons are more numerous in certain areas of the blade.
- The windshield wiper comprises a pressurizing system for applying a constant fluid pressure on the plurality of pistons, so that the pistons apply a uniform pressure all along the blade.
- The pressurizing system is supplied with a fluid derived from another system of the motor vehicle
- The pressurizing system is supplied with liquid from the windshield washer of the motor vehicle
- The pressurizing system is supplied with air from the windshield washer of the motor vehicle
- The pressurizing system is supplied with air derived from the cabin of the motor vehicle
- Each of the pistons has a front end in bearing contact with a rear side of the blade.
- Each of the pistons has a front end fitted inside the blade.
- The blade is made of a flexor and a rubber element.
- The blade is made of a rubber element.

The invention also concerns a motor vehicle, in particular a truck, comprising at least one windshield wiper as mentioned here-above.

The invention also concerns a method for operating a windshield wiper as mentioned here-above. The method consists in applying a constant fluid pressure on the plurality of pistons, so that the pistons apply a uniform pressure all along the blade.

BRIEF DESCRIPTION OF THE DRAWINGS

The invention will now be explained in correspondence with the annexed figures, and as an illustrative example, without restricting the object of the invention. In the annexed figures:

FIG. 1 is a front view of a windshield with a slight curvature;

FIG. 2 is a sectional view along line II-II on FIG. 1;

FIG. 3 is a front view of a windshield with a more pronounced curvature;

FIG. 4 is a sectional view along line IV-IV on FIG. 3;

DETAILED DESCRIPTION OF SOME EMBODIMENTS

FIGS. 1 and 2 show a windshield 2 equipping a motor vehicle 1 and having a slight curvature. If windshield 2 is wiped with a classical wiper, such as wiper 4 of FIG. 5, most parts of windshield 2 are cleaned:

FIGS. 3 and 4 show a windshield 2 having a more pronounced curvature. In particular, windshield 2 is provided with curved upper and lateral parts 3. If windshield 2 is wiped with a classical wiper, such as wiper 4 of FIG. 5, windshield 2 is left with unwiped areas, in particular in parts 3.

Figure 5:
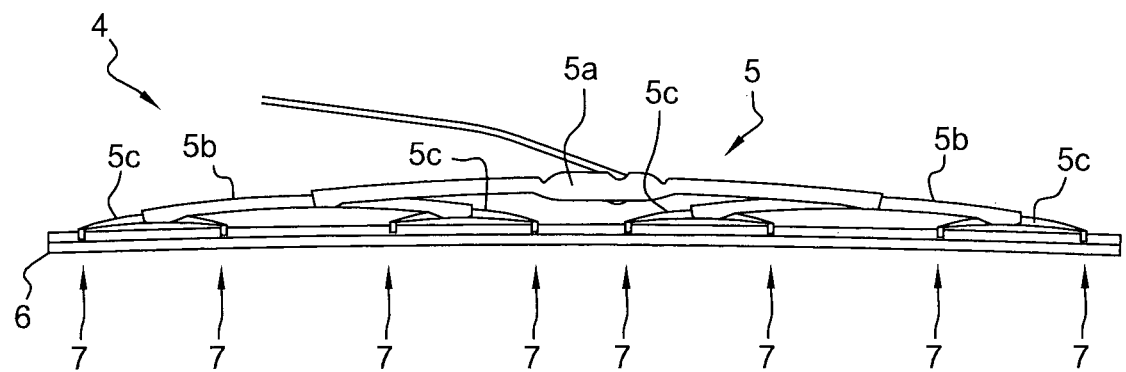
FIG. 5 is an upper view of a windshield wiper according to prior art.

FIG. 5 shows a windshield wiper 4 known from the state of the art. Wiper 4 comprises an articulated structure 5 and a blade 6. Structure 5 is formed of different elements 5a, 5b and 5c arranged on different levels, in order to distribute pressure along blade 6. More precisely, structure 5 comprises one element 5a transmitting mechanical forces to two elements 5b, which in turn transmit mechanical forces to four elements 5c, which in turn transmit mechanical forces to blade 6 on eight pressure points 7.

As the pressure on blade 6 is higher at the pressure points 7, this wiper 4 does not provide a uniform pressure distribution on a windshield.

Figure 6:
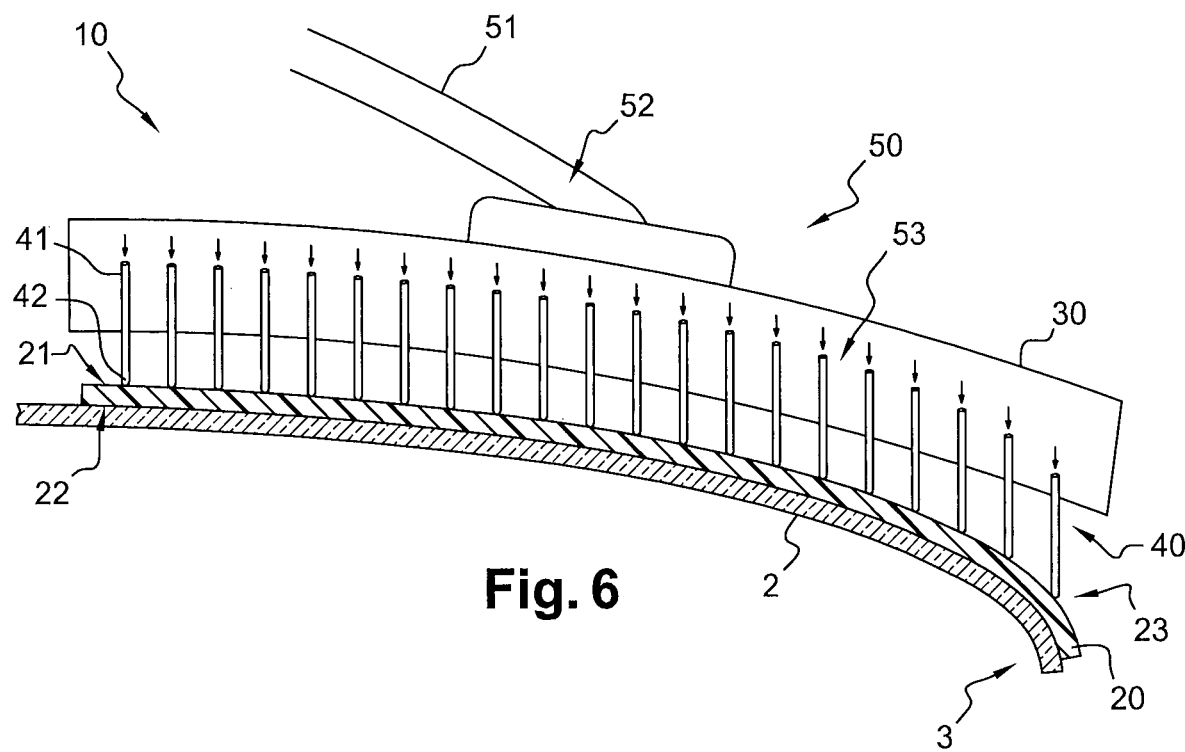
FIG. 6 is a upper view, as a schematic representation, of a windshield wiper according to the invention.

FIG. 6 shows a windshield wiper 10 according to the invention.

Wiper 10 comprises a blade 20, a body 30, a plurality of pistons 40, and a pressurizing system 50. Blade 20 is designed for wiping windshield 2 of vehicle 1. Body 30 supports blade 20, pistons 40 and system 50. Pistons 40 are distributed all along blade 20 for pressing blade 20 against windshield 2.

Blade 20 has a rear side 21 receiving pressure from pistons 40 and a front side 22 pressing against windshield 2. Blade 20 is partly fitted inside body 30, in an arrangement not shown for simplification purpose.

Blade 20 may be made of a rigid flexor and a rubber wiper. The flexor may be made of plastic or metal material. The flexor receives the pistons 40, while the rubber wiper is pressed against windshield 2.

Alternately, blade 20 can be made of a rubber wiper, without flexor.

Pistons 40 are arranged slidable relative to body 30. Pistons 40 are rigid rods, each elongated between a rear end 41 and a front end 42. Pistons 40 may be made of plastic or metal material.

Pistons 40 are non-elastic, contrary to leaf springs or helical springs disclosed in prior art. Pistons 40 are far less subjected to fatigue wear in operation, which prevent degradation of wiper 10 with time.

Rear ends 41 are arranged in body 30. Front ends 42 are arranged in bearing contact with rear side 21 of blade 20. Alternately, front ends 42 may be fitted directly inside blade 20, either directly inside its rubber wiper, or preferably inside its flexor when blade 20 is made of a rigid flexor and a rubber wiper.

In practice, the number and distribution of pistons 40 depends on size and shape of windshield 2.

Preferably, wiper 10 comprises at least ten pistons 40 distributed along blade 20. For example, wiper 10 may comprise twenty or forty pistons 40.

However, as size of windshield 2 may vary, distance between adjacent pistons 40 is more important than number of pistons 40. For example, pistons 40 may be arranged such as adjacent pistons 40 are separated by at most ten centimeters along blade 20. In another example, adjacent pistons 40 may be separated by at most five centimeters along blade 20

In a simple embodiment, pistons 40 can be regularly distributed along the blade 20. Alternately, pistons 40 can be more numerous in certain areas of blade 20, for example at an end 23 of blade 20 intended for pressing against a more curved part 3 of windshield 2.

Pressurizing system 50 is designed for applying a constant fluid pressure on rear ends 41 of the plurality of pistons 40, so that pistons 40 apply a uniform pressure all along blade 20. Thus, a more homogeneous pressure can be applied by blade 20 on windshield 2.

System 50 is supplied by a pressurized fluid, which can be a liquid or a gas, such as oil, water or air.

Preferably, system 50 is supplied with a fluid derived from vehicle 1. As non-limiting examples, system 50 can be supplied with liquid or air from the windshield washer, or air derived from a truck cabin, or from compressed air tanks located in the chassis and managed by an Air Production Management system.

System 50 comprises an arm 51, a channel 52 formed inside arm 51, and a container 53 formed inside body 30. System 50 further comprises a pump, not shown for simplification purpose, conveying fluid along channel 52 to container 53.

Figure 7:
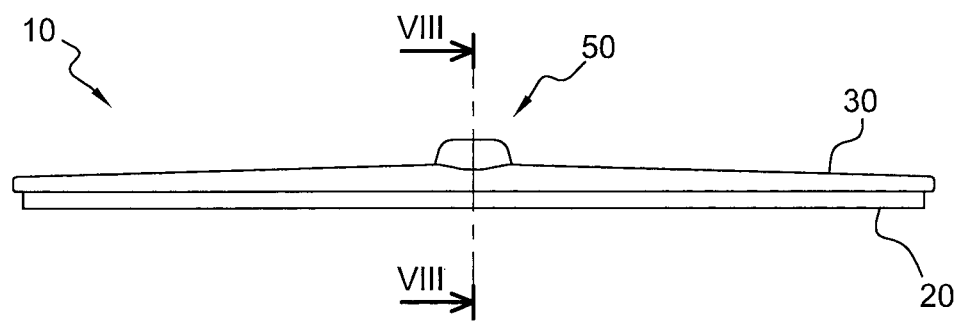
FIG. 7 is a view similar to FIG. 5, showing another windshield wiper according to the invention.
Figures 8, 9:
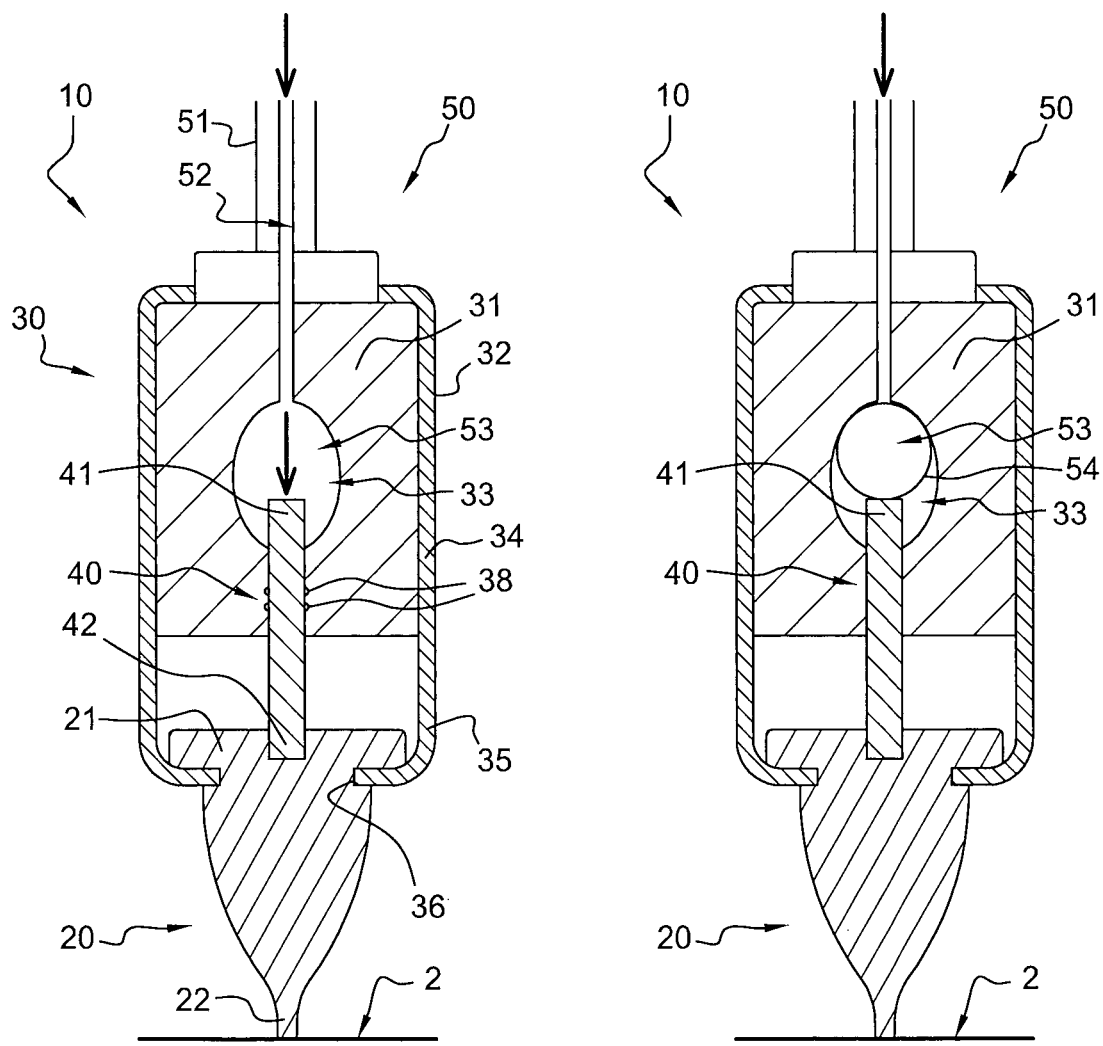
FIG. 8 is a sectional view along line VIII-VIII on FIG. 7.
FIG. 9 is a sectional view similar to FIG. 8, according to another embodiment.

FIGS. 7 and 8 show another windshield wiper 10 according to the invention. Wiper 10 has a simpler overall construction in comparison with wiper 4 of FIG. 5.

Body 30 comprises a rigid part 31 and an elastic part 32. Part 31 includes a chamber 33 which forms the container 53 receiving the fluid. Chamber 33 extends inside part 31 along the longitudinal direction of body 30. Part 32 comprises a portion 34 which surrounds part 31 and a portion 35 which extends beyond part 31 and receives blade 20. Front ends 42 of pistons 40 are fitted inside rear side 21 of blade 20. Blade 20 extends outside body 30 through an opening 36 provided in portion 35. Annular seals 38 may be fitted in body 31 around pistons 40.

FIG. 9 shows another windshield wiper 10 according to the invention.

System 50 comprises an inflating membrane 54 which is arranged inside chamber 33 of body 30 and which forms the container 53 receiving the fluid. Membrane 54 extends inside chamber 53 along the longitudinal direction of body 30.

Other non-shown embodiments can be implemented within the scope of the invention. In addition, technical features of the different embodiments can be, in whole or part, combined with each other. Thus, the windshield wiper 10 can be adapted to the specific requirements of the application.

The invention claimed is:

1. A windshield wiper, comprising:
a blade for wiping a windshield,
a body supporting the blade; and
a plurality of pistons unevenly distributed along the blade for pressing the blade against the windshield.

2. The windshield wiper of claim 1, wherein the plurality of pistons comprises at least ten pistons distributed along the blade.

3. The windshield wiper of claim 1, wherein adjacent pistons of the plurality of pistons are separated by less than about ten centimeters along the blade.

4. The windshield wiper of claim 1, further comprising a pressurizing system for applying a constant fluid pressure on the plurality of pistons to apply a uniform pressure along the blade.

5. The windshield wiper of claim 4, wherein the windshield wiper is configured to be equipped to a motor vehicle, wherein the pressurizing system is configured to receive fluid from the motor vehicle.

6. The windshield wiper of claim 5, wherein the pressurizing system is configured to receive liquid from a windshield washer of the motor vehicle.

7. The windshield wiper of claim 5, wherein the pressurizing system is configured to receive air from a windshield washer of the motor vehicle.

8. The windshield wiper of claim 5, wherein the pressurizing system is configured to receive air from a cabin of the motor vehicle.

9. The windshield wiper of claim 1, wherein each of the plurality of pistons has a front end contacting a rear side of the blade.

10. The windshield wiper of claim 1, wherein each of the plurality of pistons has a front end fitted inside the blade.

11. The windshield wiper of claim 1, wherein the blade comprises a flexor and a rubber element.

12. The windshield wiper of claim 1, wherein the blade comprises a rubber element.

13. A motor vehicle, comprising:
   a windshield wiper, comprising:
      a blade for wiping a windshield;
      a body supporting the blade; and
      a plurality of pistons unevenly distributed along the blade for pressing the blade against the windshield.

14. A method of operating a windshield wiper, comprising:
   applying a constant fluid pressure on a plurality of pistons of a windshield wiper to apply a uniform pressure along a blade of the windshield wiper, the plurality of pistons unevenly distributed along the blade; and
   pressing the blade against the windshield by the plurality of pistons.

* * * * *